Sept. 29, 1936.  W. C. HARRIS  2,056,050

AUTOMATIC CHANGE SPEED GEARING

Filed Oct. 11, 1934

Inventor:
Walter C. Harris
by Harry E. Dunham
His Attorney.

Patented Sept. 29, 1936

2,056,050

UNITED STATES PATENT OFFICE 2,056,050

AUTOMATIC CHANGE SPEED GEARING

Walter C. Harris, Erie, Pa., assignor to General Electric Company, a corporation of New York Application October 11, 1934, Serial No. 747,994

3 Claims. (Cl. 74—336)

My invention relates to driving arrangements for operating refrigerating apparatus or other machinery carried by a vehicle.

It is often desirable to drive apparatus from a variable speed source of power, such as the engine or driving shaft of the vehicle to supply power to a motor-generator set, refrigerating apparatus or other additional equipment mounted on the vehicle, which should preferably be operated within a small range of speed. Since the vehicle engine or drive shaft system is subject to wide variations in speed, it is desirable that some arrangement be provided so that the refrigerating apparatus or the like will not be subject to the same variation in speed.

An object of my invention is to provide a vehicle having an improved arrangement for establishing a driving connection between the vehicle engine or drive shaft system or the like and apparatus carried by the vehicle which will drive the apparatus with a small variation in speed.

Further objects and advantages of my invention will become apparent as the following description proceeds, and the features of novelty which characterize my invention will be pointed out with particularity in the claims annexed to and forming a part of this specification.

Figure 1:
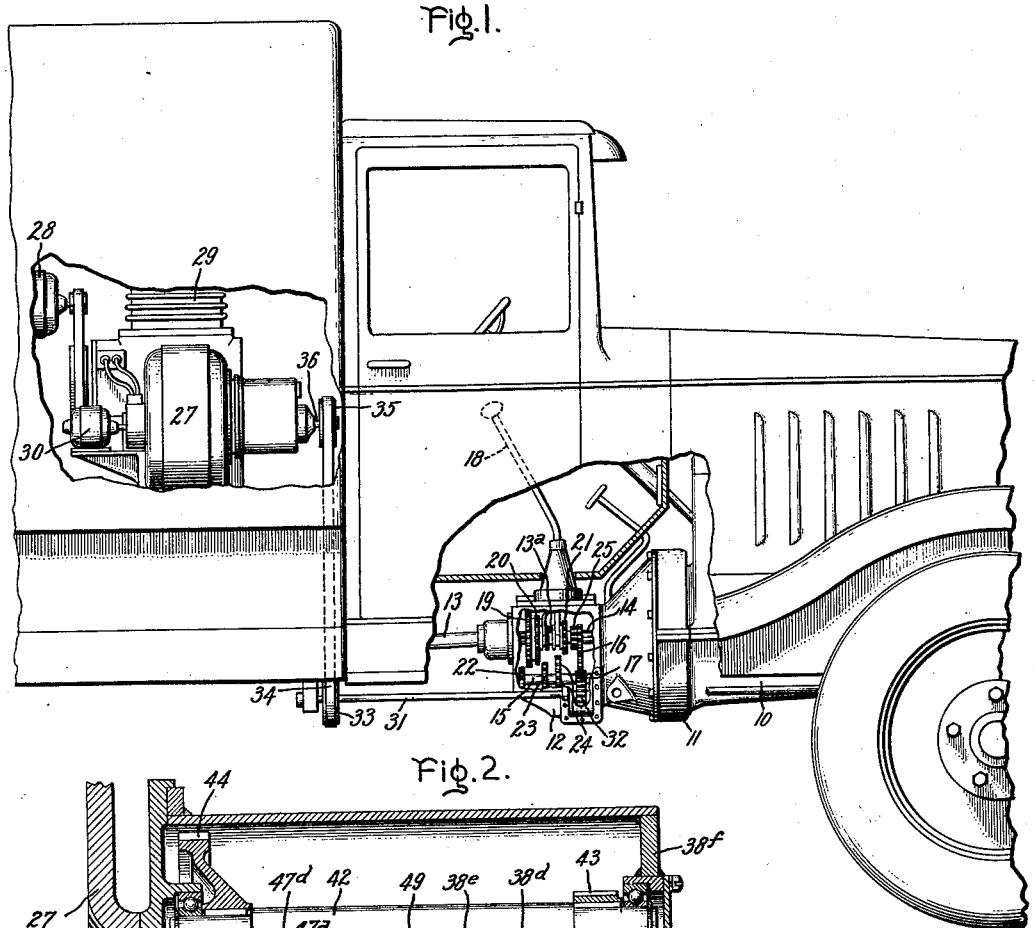
Figure 2:
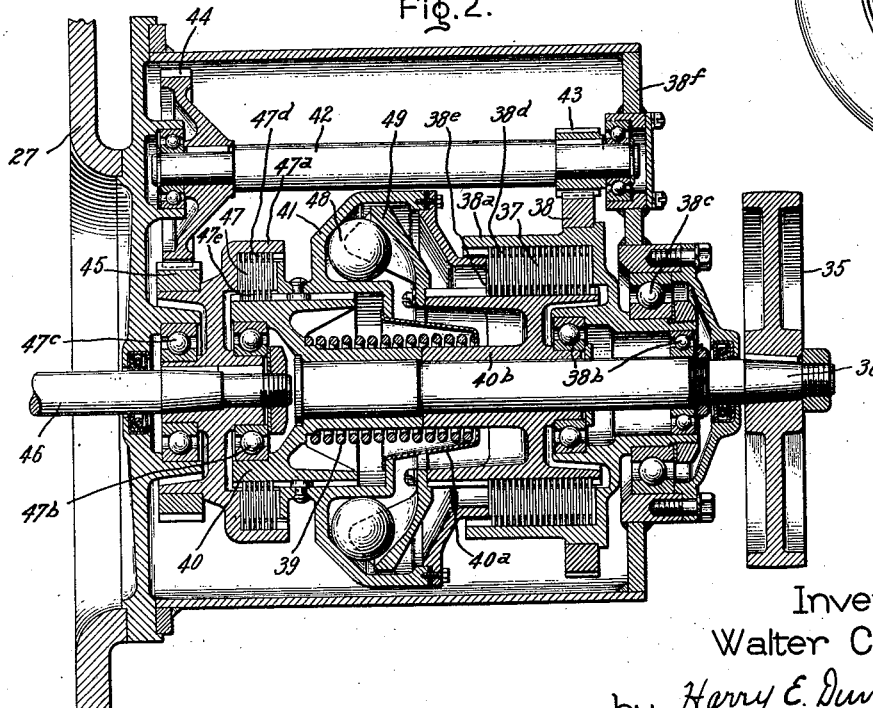

In the accompanying drawing, Fig. 1 is a side elevation of a portion of a motor truck, partly in section, provided with a refrigerating apparatus having a driving arrangement embodying my invention, and Fig. 2 is an enlarged sectional view of the speed-changing mechanism associated with the driving arrangement shown in Fig. 1.

Referring to the drawing, in Fig. 1, I have shown my invention in connection with a motor truck having an internal combustion engine 10 provided with a clutch and flywheel housing 11 and having a speed-changing gear transmission 12 for connecting the engine to drive the rear wheels of the truck through a drive shaft 13. The gear transmission 12 includes a main drive shaft 14 directly driven by the engine 10 through the clutch, and which drives a countershaft 15 through gears 16 and 17. A gear shifting lever 18 is arranged to slide gears 19, 20, and 21 mounted on a drive shaft 13a into engagement with gears 22, 23, and 24, respectively, on the countershaft 15 to obtain the first, second, and third speeds respectively of the truck. The shaft 13a is coupled to the drive shaft 13, but is separate from the shaft 14. The fourth or high speed of the truck is obtained by shifting the lever 18 to slide the gear 21 over a gear 25 which is directly driven by the shaft 14 and meshes with an internal gear formed within the gear 21.

In the construction illustrated, the engine 10 is arranged to drive an alternating-current generator 27 in order to supply current for operating a motor 28 which drives a refrigerating compressor 29. The generator 27 is provided with a direct-current exciter 30 for supplying the field current of the generator. In order to maintain proper operation of the refrigerating machine it is desirable that the generator be arranged to supply power at all times whether the truck be moving or not. The generator 27 is, therefore, connected to be driven continuously while the engine is running provided the clutch is engaged. The connection between the engine 10 and the generator 27 comprises a power take-off or countershaft 31 having a gear 32 at the forward end thereof which continually meshes with the gear 17 on the countershaft 15. The shaft 31 is connected to drive the generator 27 through a pulley 33, a belt 34, and a pulley 35 secured to a shaft 36. In the operation of the vehicle the engine speed, and therefore the speed of the shaft 31 and the generator 27 driven thereby will be subject to a wide variation.

I reduce the variation in speed of the generator 27, which supplies power to the refrigerating apparatus, by providing a centrifugally controlled speed-changing mechanism arranged between the pulley 35 and the driven shaft 46 of generator 27 which provides a high ratio of drive when the engine is running at low speed, and a lower ratio of drive when the engine is running at high speed. In this way the generator 27 is run with a small variation of speed over a wide range of variation of engine speed. This speed changing mechanism includes a normally engaged clutch 37 which completes a high ratio driving connection between the drive shaft 36 on which the pulley 35 is fixed, and a gear 38 fixed to a sleeve 38a. The sleeve 38a is rotatably supported by bearings 38b between the sleeve 38a and the shaft 36 and by a bearing 38c between the sleeve and the housing 38f of the speed changing mechanism. The clutch 37 comprises discs 38d splined on the sleeve 38a and discs 38e splined on a sleeve 40b which is fixed to the shaft 36. A spring 39 arranged in compression between a sleeve 40 fixed to the shaft 36 and a cup 40a bearing on a slidable housing 41, forces the housing 41 against the discs 38e and holds the discs 38e and 38d in driving engagement. When the clutch 37 is engaged as above described, power is transmitted from the shaft 36 and gear 38 to the generator 27 through a gear 43 secured to a counter shaft 42 journaled in the housing 38f, a gear 44 secured to the other end of counter shaft 42, and a gear 45 secured to a sleeve 47a fixed to the generator or auxiliary drive shaft 46. A bearing 47b between sleeve 40 and the sleeve 47a permits a relative rotation between sleeves 40 and 47a and a bearing 47c permits relative rotation between the sleeve 47a and the housing 38f. During low-speed operation of the engine, such as would occur when the engine was operated at idling speed, or when the vehicle was operated at low speed, the driving connection just described drives the generator at a higher speed than the engine. This driving connection would not be suitable at high engine speeds.

In order to establish a lower-speed driving connection between the engine 10 and the generator 27 when the engine speed increases, I provide a clutch 47 between the sleeve 40 fixed to the shaft 36 and the generator shaft 46 which is adapted to complete a direct driving connection between these shafts. The clutch 37 is normally engaged and the clutch 47 is arranged so that it is disengaged when the clutch 37 is engaged. The clutch 47 comprises discs 47d splined to the sleeve 47a and discs 47e splined to the sleeve 40. To engage the clutch 47, I provide a centrifugal device driven by the engine driven shaft 36 which comprises a plurality of balls 48 arranged between an inclined surface on the slidable housing 41 and an inclined collar bolted to the sleeve 40b. Under the action of centrifugal force, the balls 48 move outwardly and cooperate with the inclined collar 49 and the inclined surface of housing 41 to move the housing 41 to the left against the discs 47d in opposition to the force exerted by the spring 39. This movement of the housing 41 causes the discs 38d and 38e of the clutch 37 to become disengaged and causes the discs 47d and 47e of the clutch 47 to become engaged. This action completes a direct driving connection between the shaft 36 and the generator shaft 46 through the clutch 47, and at the same time disconnects the higher ratio driving connection between the shaft 37 and the generator shaft 46 through the counter shaft 42.

In the operation of the vehicle, power is transmitted from the engine 10 to the shaft 36 of the speed-changing mechanism through a counter shaft 31 driven by the engine and through a belt 34 which runs on the pulley 33 connected to the shaft 31 and the pulley 35 connected to the shaft 36. When the engine is running at idling speed or at low speeds, the clutch 37 is engaged and the clutch 47 disengaged. The clutch 37 completes a driving connection from the shaft 36 through gears 38 and 43 to the counter shaft 42 and from the counter shaft 42 to the shaft 46 of the generator through gears 44 and 45. This driving connection rotates the generator shaft 46 at a higher speed than the shaft 36. As the engine speed increases, the speed of shaft 36 which is driven directly from the engine also increases. When the speed of shaft 36 reaches a predetermined value which corresponds to a particular engine speed the balls 48 move outwardly and slide the sleeve 41 to the left, disengaging the discs 38d and 38e of the clutch 37 and engage the discs 47d and 47e of the clutch 47. The engagement of the clutch 47 completes a driving connection from the shaft 36 directly to the shaft 46 of the generator 27 so that these shafts now rotate at the same speed. It is apparent that during the operation of the vehicle, the generator shaft 46 is subject to a smaller variation in speed than the shaft 36 which is driven directly from the engine.

Although I have shown a particular embodiment of my invention, I do not desire to be limited to the particular construction disclosed, and I intend in the appended claims to cover all modifications which do not depart from the spirit and scope of my invention.

What I claim as new and desire to secure by Letters Patent of the United States is:

1. A power transmission including a drive shaft, a driven shaft, means including a normally engaged clutch having a sleeve provided with an inclined collar mounted on said drive shaft for providing a driving connection between said drive shaft and said driven shaft, a slidable housing having an inclined surface, a spring arranged to urge said inclined surface toward said inclined collar, means including a normally disengaged clutch for establishing a driving connection between said drive shaft and said driven shaft of lower ratio than said first mentioned driving connection therebetween, and means including a plurality of centrifugal weights retained between said inclined collar and said inclined surface and arranged to urge said inclined surface away from said inclined collar under the action of centrifugal force for disengaging said normally engaged clutch and for engaging said normally disengaged clutch.

2. A power transmission including a drive shaft, a driven shaft, means including a normally engaged clutch having a sleeve provided with an inclined collar mounted on said drive shaft and a counter shaft for providing a driving connection between said drive shaft and said driven shaft, a slidable housing having an inclined surface and arranged to engage said normally engaged clutch, a spring arranged to urge said inclined surface toward said inclined collar, means including a normally disengaged clutch for establishing a driving connection between said drive shaft and said driven shaft of lower ratio than said first mentioned driving connection therebetween, and means including a centrifugal weight arranged between said inclined collar and said inclined surface and adapted to urge said inclined surface away from said inclined collar under the action of centrifugal force for disengaging said normally engaged clutch and for engaging said normally disengaged clutch.

3. A power transmission including a drive shaft, a driven shaft, a counter shaft, means including a normally engaged clutch having a sleeve rotatably mounted on said drive shaft and connected to said counter shaft and a sleeve provided with an inclined collar for providing a driving connection between said drive shaft and said driven shaft, a slidable housing having an inclined surface and arranged to engage said normally engaged clutch, a spring arranged to urge said inclined surface of said slidable housing toward said inclined collar, means including a normally disengaged clutch for establishing a driving connection between said drive shaft and said driven shaft of lower ratio than said first named driving connection therebetween, and means including a plurality of centrifugal weights retained between said inclined collar and said inclined surface of said slidable housing arranged to urge said inclined surface away from said inclined collar under the action of centrifugal force for disengaging said normally engaged clutch and for engaging said normally disengaged clutch.

WALTER C. HARRIS.